United States Patent [19]

Tsai

[11] Patent Number: 4,513,927
[45] Date of Patent: Apr. 30, 1985

[54] REWINDING APPARATUS FOR VIDEO CASSETTE

[76] Inventor: Yeh C. Tsai, No. 6, Lane 308, Pao-Shan Rd., Hsinchu City, Taiwan

[21] Appl. No.: 520,997

[22] Filed: Aug. 8, 1983

[51] Int. Cl.³ .................. G03B 1/02; B65H 59/38; G11B 15/13
[52] U.S. Cl. .................................. 242/191; 360/96.6
[58] Field of Search .................. 242/186, 188–190, 242/192, 197, 198, 201; 360/96.1, 96.5, 96.6, 93

[56] References Cited

U.S. PATENT DOCUMENTS

| | | | |
|---|---|---|---|
| 3,863,267 | 1/1975 | Fujinaka | 360/93 |
| 3,902,681 | 9/1975 | Boehme | 242/198 |
| 3,974,982 | 8/1976 | Stone | 242/192 |
| 3,988,779 | 10/1976 | Leis et al. | 360/96 |
| 4,259,701 | 3/1981 | Pera | 360/96.5 |

FOREIGN PATENT DOCUMENTS 1044822  11/1953. France .................. 242/201

OTHER PUBLICATIONS

IBM Technical Disclosure Bulletin, vol. 15 No. 1, Jun. 1972; "Floating Belt Tension Adjustor" F. Gratkowski, p. 193.

Primary Examiner—Leonard D. Christian
Attorney, Agent, or Firm—Lackenbach Siegel Marzullo Presta & Aronson

[57] ABSTRACT

A tape rewinding apparatus which can be lifted in response to a sudden relaxion of the transmission belt upon the tape running to the end and the winding spindle is hindered from rotating. The change of tension is sensed by a small pulley which is biased firmly against the transmission belt and driven thereby. A controlling member having a fixed end capable of retaining a catch member is disposed on the compartment lid, and having a free end to which the small pulley is mounted. By such arrangement, at the moment the tension relaxes, the controlling member will disengage the catch member.

2 Claims, 3 Drawing Figures

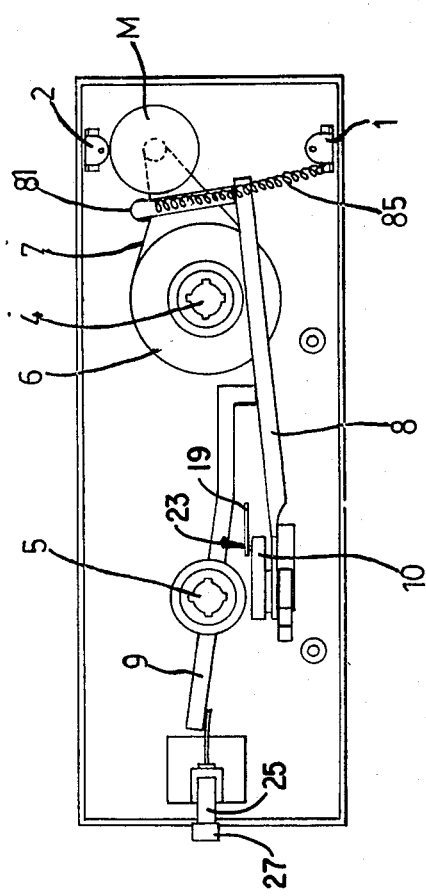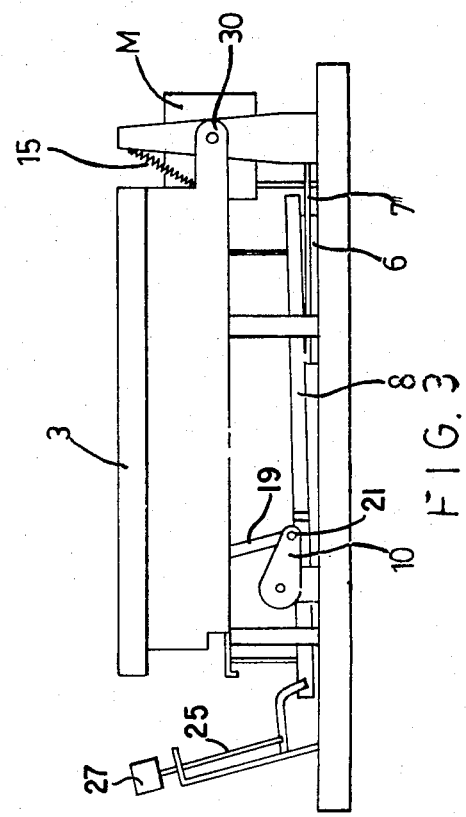

REWINDING APPARATUS FOR VIDEO CASSETTE

CROSS-REFERENCE TO RELATED APPLICATION

This application is a continuation-in-part of Ser. No. 208,190, Nov. 19, 1980, now U.S. Pat. No. 4,380,322.

BACKGROUND OF THE INVENTION

The present invention relates to an improved rewinding apparatus to video cassette, more specifically concerning a mechanically simplified one which can automatically eject the cassette.

In order to make the magnetic head durable, a conventional video cassette recorder does not employ the built-in rewinding apparatus to rewind the tape. Instead, an independent rewinding apparatus is usually used to perform the function. When the independent rewinding apparatus is at work, the user is tied by watching and must wait till the completion of the rewinding, and then eject the cassette manually. To avoid the inconvenience of such apparatus, some automatically ejecting type rewinding apparatuses appear in the market, one of which as referred above, generally comprises a built-in tape end detecting solenoid actuated by the electric signal to start the cassette ejection action; and an electronic control circuit for automatically cutting off the power supply.

SUMMARY OF THE INVENTION

It is a primary object of the present invention to provide a video cassette rewinding apparatus with simple construction which is of great advantage to economically manufacture.

It is another object of the present invention to provide a video cassette rewinding apparatus in which an ejection action is induced mechanically.

In general, the present tape rewinding apparatus includes a frame, a cassette compartment lid having an end pivoted at the frame, and a winding spindle driven by a transmission belt, wherein the improvement comprises a catch member disposed at the cassette compartment lid for fastening the cassette compartment lid in closed position; a controlling member pivoted at the frame for controlling the release of the catch member, including a free end, biassed by the spring member to abut against the transmission belt and being moved in bias direction to actuate the controlling member to release the catch member in response to the decrease of tension of the transmission belt when the winding spindle is hindered from rotating.

The tension sensing member mentioned above is preferred to be a small pulley driven by the transmission belt.

This and other objects can be more apparent by describing a preferred embodiment with reference to the following drawings, in which:

BRIEF DESCRIPTION OF THE DRAWINGS

FIG. 2 is a top view of the present video cassette rewinding apparatus showing the ejection mechanism;

FIG. 3 is a side view of the present video cassette rewinding apparatus.

DETAILED DESCRIPTION OF THE PREFERRED EMBODIMENTS

Figure 1:
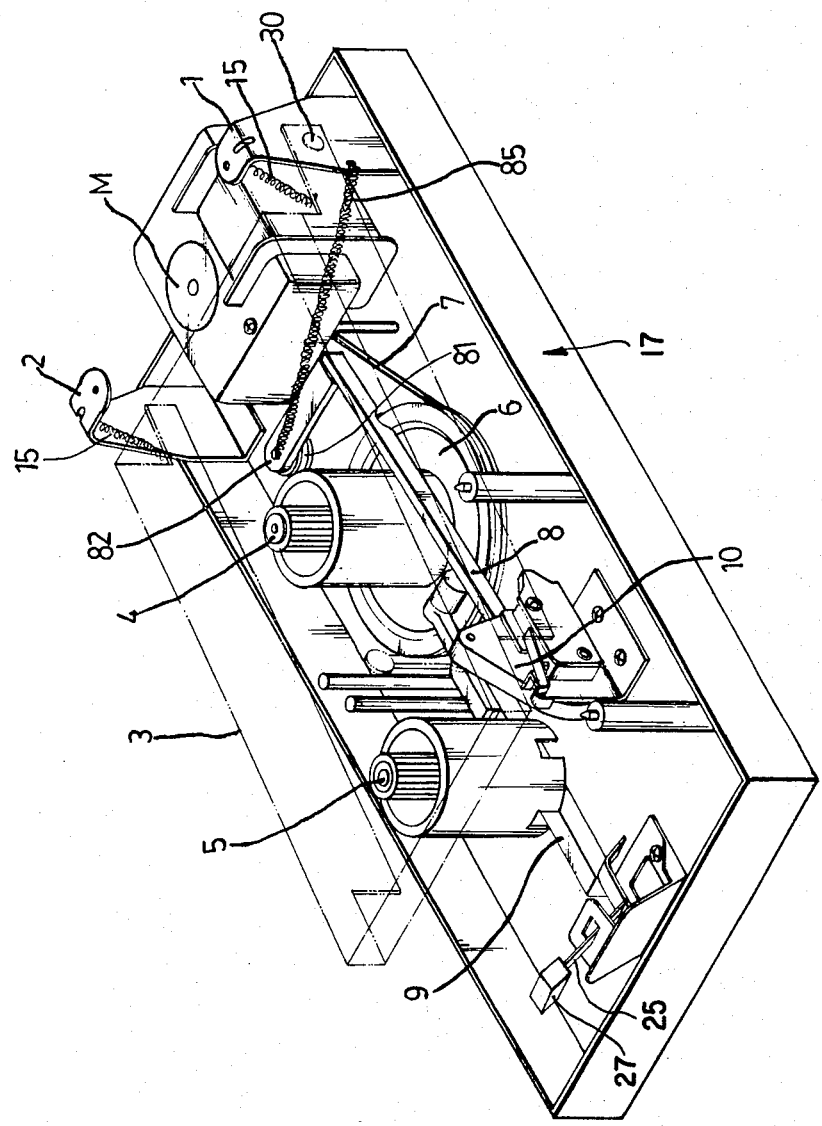
FIG. 1 is a perspective view of the present video cassette rewinding apparatus according to the present invention.

Referring now to FIG. 1, there is shown a tape rewinding apparatus of the invention. A pair of brackets 1 and 2 are mounted on frame 17 and are disposed in a parallel position and spaced from each other. A cassette compartment lid 3 which has a groove (not shown in the drawings) thereof for holding the cassette, is pivoted at the brackets 1 and 2 by pins 30 (one shown). At the underside of the lid 3, as best shown in FIG. 3, there is provided a connecting element 19 which is pivoted to a crank arm 10 at the lower end by a pin, 21 and the pin 21 has an extended portion to serve as a catch member 23. The lid 3 is pulled open by a pair of springs 15, 15 through crank arm 10 to buffer the ejection action. A winding spindle 4 is driven by transmission belt 7 through a pulley 6 which is provided at the bottom of the winding spindle 4.

Above the pulley 6, straight arm 8 is provided in such manner that it can be moved outwardly, with one end fixed on the bottom of frame 17 and adjacent to the crank arm 10.

Pivoted to the winding spindle 4 under the pulley 6 is a tongue member (not shown) with the free end thereof being mounted with a small pulley 81 which is also driven by transmission belt 7. On the tongue member a push bar 82 is disposed, which may push against the arm 8 away from the engagement position with the pin 21.

As shown in FIG. 2, a coil spring 85 serving as an actuating means of the lifting action of compartment lid 3 is connected between the arm 8 and bracket 1, which pulls the arm 8 and the associated small pulley 81 more near the bracket 1, and thus forcing the small pulley 81 tightly abutting to the transmission belt 7.

An extended push member 9 is pivotally supported under the other winding spindle 5, which can be pushed to move the straight arm 8 to release the catch member 23 from the arm 8 through a finger element 25 which is actuated by a button 27.

As the rewinding is desired to begin, after the video cassette being inserted into the groove, the compartment lid 3 is pressed down and the catch member 23 will be retained by the lower surface of the arm 8 to close the lid 3. During rewinding of the video tape, the small pulley 81 is subjected to a substantially constant tension of the transmission belt 7.

As soon as the tape runs to the end, the winding spindle 4 is hindered from rotating. At this moment, the ongoing motion of a motor will cause the slip of the transmission belt 7 on the small pulley 81, and the resulted decrease of tension of the transmission belt allows the small pulley 81 as well as the push bar 82 to push away the straight arm 8, this action causes the catch member 23 be disengaged by arm 8, thus actuating the compartment lid 3 to open.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims which scope is to be accorded the broadest interpretation so as to encompass all such modifications and equivalent structures.

What I claim is:

1. An improved tape rewinding apparatus for a video cassette including a frame, a cassette compartment lid having an end pivoted at said frame, and a winding spindle driven by a transmission belt, the apparatus comprising:
- a catch member disposed at said cassette compartment lid for fastening said cassette compartment lid in closed position;
- a controlling member pivoted at said frame for controlling the release of said catch member, including a free end;
- a spring member; and
- a tension sensing member, biassed by said spring member to abut against said transmission belt and being moved in bias direction to actuate said free end of said controlling member to release said catch member in response to the decrease of tension of the transmission belt when the winding spindle is hindered from rotating.

2. An improved tape rewinding apparatus for a video cassette as defined in claim 1, wherein said tension sensing member includes an actuating rod pivotally mounted on said frame, and a pulley rotatably mounted on said actuating rod to abut against said transmission belt.

* * * * *